April 13, 1937.   G. D. GARDNER   2,076,942
CHERRY CUTTING APPARATUS
Filed March 30, 1934
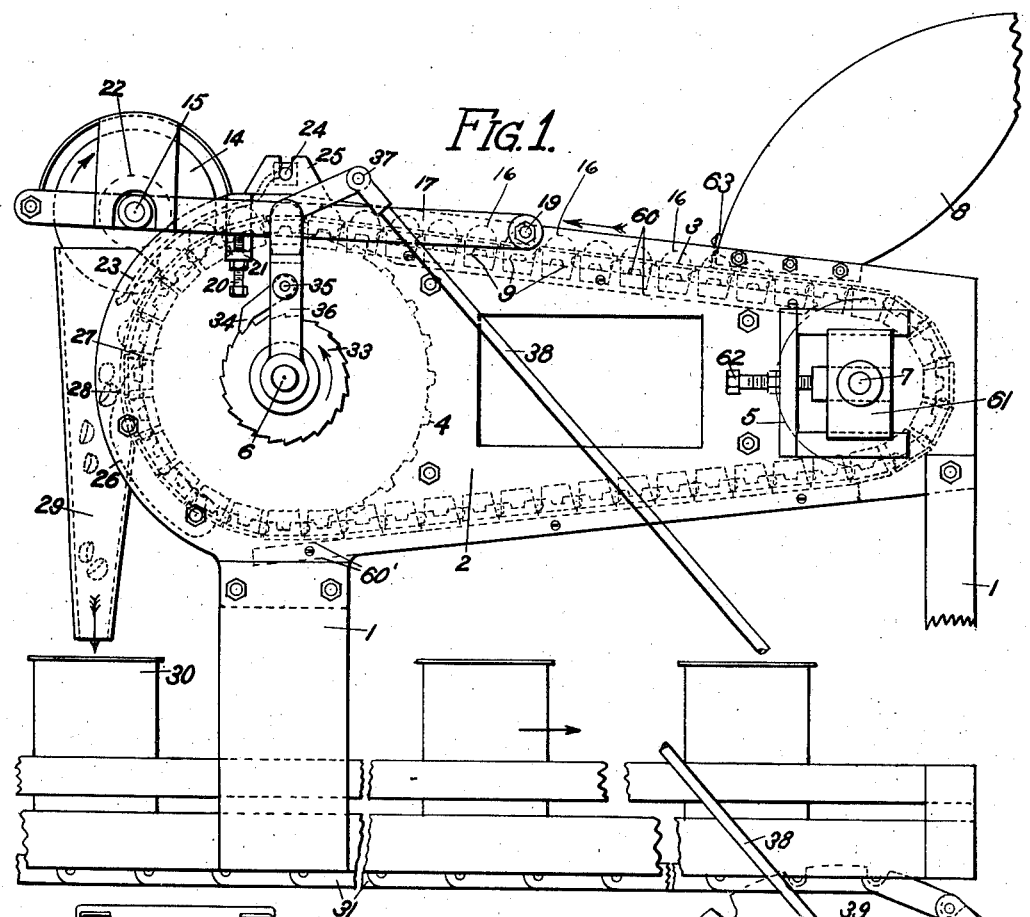
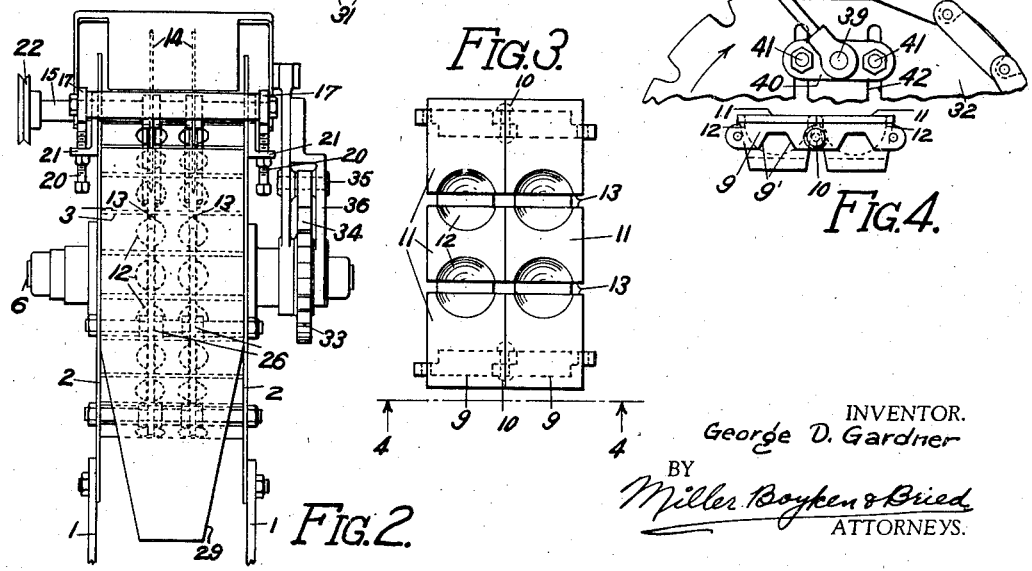
INVENTOR.
George D. Gardner
BY
Miller, Boyken & Bried
ATTORNEYS.

Patented Apr. 13, 1937

2,076,942

UNITED STATES PATENT OFFICE 2,076,942

CHERRY CUTTING APPARATUS

George D. Gardner, San Jose, Calif.

Application March 30, 1934, Serial No. 718,165

12 Claims. (Cl. 226—2)

This invention relates to fruit cutting apparatus similar to that shown in my co-pending application No. 706,613 and has for its objects an improved machine for cutting units of fruit into a predetermined number of pieces and for depositing the pieces into cans or elsewhere as desired, which machine is adapted to discharge a predetermined number of the cut pieces therefrom, with means for varying said number according to the number of pieces it is desired to deposit into each can. Other objects will appear in the specification.

In the drawing, Fig. 1 is a side view of my device with the can conveyor broken at one end to accommodate the view to the side of the sheet.

Fig. 2 is an end view of the device as seen from the discharge end thereof.

Fig. 3 is an enlarged plan view of the conveyor for carrying the units of fruit.

Fig. 4 is a side view of several units of the portion shown in Fig. 3 as seen from the line 4—4 of Fig. 3.

Briefly described, this invention comprises an endless conveyor made up of links provided with outwardly opening recesses, each being arranged and adapted to support a unit of fruit, such as a whole, pitted, maraschino cherry therein. The upper rim of the belt is generally horizontally extending with a feed hopper disposed over one end thereof for feeding the cherries into the pockets, and a cutting knife at the opposite end bisecting the path of travel of the fruit so that the cherries are bisected by the knife as the conveyor carries them therepast. After passing the knife, a stationary cam-like plate terminating at one end below the path of travel of the cherries and extending across said path is adapted to lift the cut halves of fruit out of the pockets for subsequent falling of the halves into cans positioned below the end of the fruit conveyor.

A can conveyor disposed below the fruit conveyor is connected to intermittently advance the fruit conveyor so that the fruit conveyor will advance when a can is below the discharge end of the fruit conveyor, but during the interval between the passing of one can from below the discharge end of the fruit conveyor and while another can is being advanced to said end for receiving a charge of fruit, the fruit conveyor is idle. The number of pieces of fruit discharged from the fruit conveyor during the periods of movement of the fruit conveyor is determined by the distance the fruit conveyor is intermittently advanced, and means is provided for regulating this. Thus I may adjust the apparatus to discharge four halves of cherries into each can, or eight or twelve halves or more if desired, and it is obvious that by providing a fruit conveyor with a single row of pockets instead of a double row, (as shown in the drawing) I may provide for discharging two, four, six, eight, ten, etc., halves of fruit into cans as desired.

In detail my invention comprises a frame 1, supporting a housing comprising spaced opposed vertical side plates 2 between which is a generally horizontally extending fruit conveyor 3 of the endless type mounted on sprockets 4 at the discharge end and sprockets 5 at the feed end, which sprockets are respectively secured on rotatably mounted shafts 6, 7.

The upper run of conveyor 3 extends at a slight incline upwardly from the feed end, to the discharge end by reason of the shafts 6, 7 being disposed in the same horizontal plane and sprocket 4 being larger than sprocket 5, and on the feed end of the conveyor is a feed hopper 8 with its lower edges adjacent the upper side of the conveyor.

In detail, the conveyor itself is of the endless carrier type made up of a pair of spaced opposed rows of links 9 pivotally connected together at 10, and formed between each pair of opposed links integrally therewith is a substantially rectangular block of metal 11 provided with a pair of spaced outwardly opening hemispherical recesses 12 in its outer surface, see Figs. 3, 4. These blocks are slotted as at 13 in the direction of the conveyor through the recesses 12, bisecting the recesses, and the slots are sufficiently deep to extend below the bottom of each recess to receive the edge of the blade of a circular cutting knife that is secured to a rotatably mounted shaft 15 adjacent the sprocket 4 at the discharge end of the conveyor. There are two knives 14 on said shaft, each with its edge disposed in the slots 13 with the periphery of the knife below the bottom of the hemispherical pockets 12 so that cherries, indicated at 16 in Fig. 1, will be bisected as the conveyor carries them past the knives.

Shaft 15 is rotatably supported at its opposite ends adjacent one end of a pair of spaced elongated arms 17, which arms are pivotally connected to plates 2 at 19 at points about midway between sprockets 4, 5. This permits the knives to be raised or lowered in slots 13 for accurate adjustment, and this adjustment is effected by means of adjusting screws 20 supported in brackets 21 secured to plates 2 intermediate the pivots 19 and shaft 15, the arms resting on the inner ends of screws 20 so that by turning the screws the arms are raised or lowered.

The knives 14 are rotated by means of a pulley 22 on one end of shaft 15, a belt, not shown, connecting the pulley with the conveyor operating means or with any other source of power as may be desired.

The direction of rotation of the knives 14 is as indicated by the arrow, and to prevent the cherries from being dislodged from the pockets in which they are supported while being cut, I provide a pair of hold-down arms of wire 23 on either side of each of the knives, which arms are relatively close to the sides of the knives respectively and slidably rest on opposite halves of the cherries as they pass the knives. The hold-down arms 23 are pivotally supported at one of their ends each in a rod 24 rotatably supported at its ends in brackets 25 secured to the frame of the machine. This construction permits the outer ends of the arms to yieldably engage the cherries as they pass the knives and if desired an ordinary torsion spring may be mounted on shaft 24 to increase the pressure of the arms on the cherries, or the arms may be counterweighted to accomplish the same result; but ordinarily the weight of the arms themselves has been found to be sufficient.

After passing the knives, and after the cherries are bisected, the cut faces of the halves immediately close together, since the knives are relatively thin, and should the cherries by any chance tend to stick in the pockets, they are positively removed therefrom by plates 26, each of which is positioned edgewise in one of the slots 13 and is pointed at its upper end at 27 within the slot so the cherries will ride out of the pockets 12 on the outwardly inclined edge 28 of the plate and fall by gravity through a vertically directed funnel-shaped chute 29 into a can 30 positioned below its lower open end on a horizontal can carrier 31.

The fruit conveyor 3 is intermittently advanced upon a can being positioned below the chute 29 by means of a pawl and ratchet device operated by movement of the sprocket 32 that carries and operates the can carrier 31.

This pawl and ratchet device comprises a ratchet wheel 33 secured on shaft 6 of the fruit conveyor adjacent and outwardly of one of the side plates 2 and is intermittently rotated in the direction of the arrow by means of a pawl 34 pivotally connected at 35 to an arm 36, the pawl being positioned to engage the teeth of the ratchet by gravity, or a suitable spring may be used if desired. The outer end of the arm 36 is pivotally connected at 37 with the end of a connecting rod 38, which connecting rod is pivotally connected at 39 with a block 40 that is radially adjustable on sprocket 32 of the can conveyor by means of bolts 41 engaging in slots 42 of the sprocket.

From the foregoing it will be seen that upon rotation of the can conveyor sprocket 32 for moving the cans successively below discharge chute 29 of the cherry bisecting machine, the fruit conveyor will be intermittently advanced in a direction to pass a predetermined number of cherries past the cutting knives according to the distance the block 40 is positioned from the axis of sprocket 32, since the pawl 34 positively rotates sprocket 4 during a portion of the rotation of can conveyor sprocket 32. Likewise, said predetermined number of cherries will be ejected from the recesses or pockets 12 by plate 26 and will fall through chute 29 into cans 30. The timing of the conveyor sprocket is such that the fruit conveyor will be advanced and the cherries ejected therefrom only when a can is in position to receive the ejected cherries, said timing arrangement being merely a matter of mechanics.

Supporting the upper horizontal run of the conveyor between sprockets 4, 5 are plates 60, one on each of the side plates 2, and which plates respectively slidably engage the links 9, which links in turn are engaged by the sprockets at the ends of the conveyor, being recessed at 9' for that purpose.

Below the lower run of the conveyor are side guide plates 60' that slidably support the return run of the conveyor.

It will be noted that sprocket 5 is provided with a take-up block 61 through which shaft 7 revolvably extends, and which block is adjustable by a screw 62.

In order to insure against loose cherries being carried over the carrier, I may provide a flexible strip 63 across or adjacent the front edge of hopper 8, which strip does not disturb the cherries seated in the recesses in the carrier, but merely rolls back the loose ones, and the upper edges of plates 2 extend above the links of the carrier at opposite sides forming upstanding sides to retain any loose cherries against rolling off the carrier.

Having described my invention, I claim:

1. In a machine of the character described, means for passing a row of cherries along a path of travel in spaced relation, a rotatably mounted circular knife arranged and adapted to bisect the cherries as they pass along, said means comprising an endless carrier provided with a row of outwardly opening substantially hemispherical recesses each adapted to support a cherry therein, said carrier having an outwardly opening slot extending in the direction of travel of the carrier and through the walls of the row of recesses for receiving the peripheral edge of the knife therein, means for revolving said knife and yieldably mounted means positioned adjacent the opposite sides of the knife arranged and adapted to retain the cherries within the recesses when the cherries are bisected by the knife upon being carried therepast, and means for ejecting the bisected cherries from the recesses.

2. In a machine of the character described, a carrier arranged and adapted for supporting and moving cherries in a row in spaced relation along a path of travel comprising an endless chain of links, means mounting said chain for movement in a vertical plane, each of said links provided with a body having a vertically outwardly opening recess adapted to receive a cherry therein, the recesses being positioned in a straight line longitudinally of the chain and the walls of said recesses having outwardly opening slots therein extending in the direction of travel of the chain, a knife positioned with its cutting edge within said slot arranged to cut the cherries as the carrier is moved to carry the cherries past the knife, means for ejecting the cut cherries from said path of travel, a can conveyor arranged and adapted to successively position a can to receive the cherries ejected from the carrier, means for continuously operating said can conveyor, and means connecting said can conveyor and carrier for intermittently advancing said carrier upon actuation of said can conveyor.

3. In a machine as defined in claim 2, the connection between the carrier and conveyor being such that the carrier is advanced only when a can is in position to receive the fruit ejected from the carrier.

4. In a machine of the character described, a carrier arranged and adapted for supporting and moving cherries in a row in spaced relation along a path of travel comprising an endless chain of links, a sprocket engaged in one end of said chain supporting the chain for movement in a vertical plane and means engaging within the opposite end of the chain adapted for supporting said chain with its upper run extending generally horizontal, the links of the chain each having a body provided with a vertically opening recess adapted to support a cherry therein, a knife arranged and adapted to cut the cherries upon movement of the carrier and means for intermittently advancing the carrier a predetermined distance whereby a predetermined number of cherries are cut with each advance of the carrier, a can conveyor arranged and adapted to successively position a can to receive the cherries cut by said knife upon each advance of the carrier, and the means for advancing the carrier being adjustable to increase or decrease the distance the carrier is advanced during each intermittent movement thereof as desired.

5. In a machine as defined in claim 4, means for operating said can conveyor for successively positioning said cans as described, said means for intermittently advancing said carrier comprising a link and crank mechanism connecting said can conveyor and the sprocket mounting end of said chain.

6. In a machine of the character described, an endless belt-like carrier provided with a row of outwardly opening recesses in its outer surface, each of said recesses being adapted to support an object therein for movement along a path of travel upon movement of the carrier, means mounting said carrier for movement in a vertical plane around a pair of spaced parallel horizontal axes, means disposed at a predetermined point in the path of travel of the objects arranged and adapted to successively eject said objects from said path of travel upon movement of the carrier, means arranged and adapted to intermittently move said carrier a predetermined distance whereby the objects are intermittently moved a predetermined distance along said path of travel and a predetermined number of said objects are successively ejected from said path of travel at intervals, a cutting device positioned in the path of travel of said objects arranged and adapted to cut said objects into several pieces previously to their ejection from said path of travel.

7. In a machine of the character described, an endless belt-like carrier provided with a row of spaced outwardly opening recesses in its outer surface, each of said recesses being adapted to support an object therein for movement along a path of travel upon movement of the carrier, means mounting said carrier for movement in a vertical plane around a pair of spaced horizontal axes, means disposed at a predetermined point in the path of travel of the objects arranged and adapted to successively eject said objects from said path of travel upon movement of the carrier, means arranged and adapted to intermittently move said carrier a predetermined distance whereby the objects are intermittently moved a predetermined distance along said path of travel and a predetermined number of said objects are successively ejected from said path of travel at intervals, a cutting device positioned in the path of travel of said objects arranged and adapted to cut said objects into several pieces previously to their ejection from said path of travel and means arranged and adapted to engage each of said cut pieces for retaining the same in said recesses positioned over a portion of the path of travel of the objects between said cutting device and the means for ejecting said objects.

8. In a machine of the character described, a carrier comprising an endless chain of pivotally connected links, means mounting said carrier in a vertical plane for movement around a pair of horizontally spaced horizontal axes providing a straight upper run of chain between said axes, the links of said chain being formed with flat outer surfaces arranged substantially flush, thereby providing a table-like flat upper surface along said straight upper run and said links being provided with substantially hemispherical shaped recesses below their flat outer surfaces arranged in a straight row along the chain, the walls of said recesses having outwardly opening slots therein extending in the direction of movement of the carrier, a circular knife positioned outwardly of the chain with its cutting edge extended into said slots for successively cutting objects adapted to be supported in said hemispherical recesses upon movement of the carrier around said axes, means for so moving said carrier and means for revolving said circular knife.

9. In a construction as defined in claim 8, a feed device positioned over said table-like flat upper run of the carrier adapted to feed objects onto said flat upper run for dropping into the recesses in the carrier and means projecting upwardly above the flat upper surface of said carrier extending longitudinally of the carrier on opposite sides of said recesses for retaining objects deposited on said upper run against dropping over the side edges of said chain.

10. In a construction as defined in claim 8, the means mounting said carrier for movement including a pair of spaced sprockets and a shaft on one of said horizontal axes mounting said sprockets for rotation, means formed on said links on opposite sides of the recesses arranged and adapted to engage the teeth of the sprockets respectively and the walls of said recesses extending below the means adapted to engage the teeth of said sprockets.

11. In a machine of the character described, an endless carrier arranged and adapted for supporting a row of objects in equally spaced relation for movement in one direction along a path of travel extending longitudinally of the row upon movement of the carrier, stationary means disposed across said path of travel at a point in said path arranged and adapted to successively remove the objects from said path at said point upon movement of the carrier and means for moving said carrier a predetermined distance at uniformly spaced intervals of time whereby said objects will be successively removed from said path of travel by said stationary means and a predetermined number of said objects will be removed from said path of travel at uniformly spaced intervals of time, the means for moving said carrier comprising a continuously actuated conveyor disposed adjacent said carrier, said conveyor being arranged and adapted to support and to successively position a receptacle adjacent said stationary means for receiving said predetermined number of objects removed by said stationary means from the path of travel of said objects, and means for varying the distance of movement of said carrier at said spaced intervals.

12. The method of depositing units of fruit into containers comprising continuously moving a row of spaced containers along a path of travel in the direction of the row past a fixed point, moving a row of uniformly spaced units of fruit along a path of travel positioned above said row of containers during the period of time a container of the row of containers is moving past said fixed point and stopping the movement of the units of fruit during the interval of time between the passage of a container past said fixed point and the arrival of the next successive container at said fixed point and successively ejecting a plurality of units of fruit from the path of travel thereof at a point directly above said fixed point only when the fruit units are being moved along the path of travel thereof.

GEORGE D. GARDNER.